United States Patent
Braun et al.

(10) Patent No.: US 6,636,961 B1
(45) Date of Patent: Oct. 21, 2003

(54) SYSTEM AND METHOD FOR CONFIGURING PERSONAL SYSTEMS

(75) Inventors: Timothy L. Braun, Susquehanna, PA (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/350,591

(22) Filed: Jul. 9, 1999

(51) Int. Cl.[7] .............................................. G06F 15/177
(52) U.S. Cl. .......................................... 713/1; 713/100
(58) Field of Search ..................... 713/1, 100; 717/168, 717/170, 174, 121, 169, 175

(56) References Cited

U.S. PATENT DOCUMENTS

| | | | |
|---|---|---|---|
| 5,475,819 A | 12/1995 | Miller et al. ............ 395/200.03 |
| 5,499,357 A * | 3/1996 | Sonty et al. ................ 710/104 |
| 5,555,416 A | 9/1996 | Owens et al. ............... 395/700 |
| 5,600,781 A | 2/1997 | Root et al. .................... 395/326 |
| 5,713,009 A | 1/1998 | DeRosa, Jr. et al. ........ 395/500 |
| 5,832,274 A * | 11/1998 | Cutler et al. ................. 395/712 |
| 6,110,229 A * | 8/2000 | Yamaguchi ................... 717/11 |
| 6,161,176 A * | 12/2000 | Hunter et al. ................... 713/1 |
| 6,182,212 B1 * | 1/2001 | Atkins et al. ................... 713/1 |
| 6,256,635 B1 * | 7/2001 | Arrouye et al. ............. 707/102 |
| 6,366,954 B1 * | 4/2002 | Traversat et al. ........... 709/220 |
| 6,487,558 B1 * | 11/2002 | Hitchcock ................... 707/200 |

* cited by examiner

Primary Examiner—Dennis M. Butler
(74) Attorney, Agent, or Firm—Shelly M Beckstrand; William E. Schiesser

(57) ABSTRACT

A system previously cloned with an operating system and a collection of applications has personal configuration data customized for the user receiving the system by a configuration tool. When the configuration tool is used in an interactive mode, a dialog displays the existing configuration and allows the installer or user to modify and save it. When the configuration tool is used in a non-interactive mode, that is, for migration, the machine configuration information is obtained from or put to an operating system independent configuration data file without using the configuration dialog. In interactive mode, a user dialog is displayed with the list of all the supported applications that are found to be installed on the system. Selecting one of the listed applications brings up an application dialog including input fields for each of the configuration items for that application. Configuration data can be imported from or exported to the configuration data file 160. This allows an installer to export from an old system and import into the new one when hardware is being upgraded. Also, the import and export feature is used to automate configuration and information gathering.

17 Claims, 11 Drawing Sheets

APPLICATION SUPPORT

CONFIGURATION PROCEDURES

SYSTEM AND METHOD FOR CONFIGURING PERSONAL SYSTEMS

BACKGROUND OF THE INVENTION

1. Technical Field of the Invention

This invention pertains to configuring new personal systems. More particularly, it pertains to a configuration tool capable of migrating user configurations from one operating system to another, reconfiguring the system once deployed, and maintaining a central database of configurations.

2. Background Art

Before a personal system can be put to productive use, a plurality of software products including an operating system and several applications must be installed, and the operating environment properly configured. These operating system and application programs grow in number and change with new releases, and system users periodically upgrade their personal systems to newer, more powerful models. It is not unusual for organizations to have to install large numbers of personal computer systems and configure operating environments on hundreds and thousands of such systems. These systems typically include some software and operating environments that are common, at least within related organizations, and yet each system differs in accordance with the specific needs and preferences of the individual user.

One approach to delivering new computer systems to personnel within an organization is to clone the system with the operating system and all applications installed. Then, each application setup or configuration application is run to personalize the system for the unique needs and environment of the user. While this process does work, it is very time consuming and labor intensive.

Sometimes when installing a new release of an application, the start up code for the new release erases configuration information from the previous release required in the new environment.

It is an object of the invention to provide an improved system and method for personalizing a cloned system so that it will function for a particular user.

It is a further object of the invention to provide an improved system and method for configuring a machine after an image has been loaded onto that machine.

It is a further object of the invention to provide a system and method for migrating a user configuration from one operating system to another.

It is a further object of the invention to provide a system and method for enabling a user to reconfigure a previously deployed system for use at another location without having to reload the software on the machine.

It is a further object of the invention to provide a system and method for maintaining a central database of configurations.

It is a further object of the invention to provide a system and method for selectively preserving preexisting configuration information for use in a new environment.

It is a further object of the invention to provide a system and method allowing a user to be migrated from one operating system to another.

SUMMARY OF THE INVENTION

In accordance with a first aspect of the invention, a method is provided for configuring a computer system, comprising the steps of migrating a user configuration from a first operating system to a second operating system; and reconfiguring the computer system with the user configuration and the second operating system.

In accordance with another aspect of the invention, there is provided a system for configuring a computer system with respect to one or more applications, comprising a memory; an export file; and for each supported application, an installed method for determining if the application is installed on the system; a load_data method for loading configuration data for the application into memory; an import_data method for replacing configuration data in the memory with configuration data held in the export file; and an export_data method for writing configuration data from the memory to the export file.

In accordance with another aspect of the invention, there is provided a computer program product configured to be operable to configure a computer system by migrating a user configuration from a first operating system to a second operating system and reconfiguring the computer system with the user configuration and the second operating system.

Other features and advantages of this invention will become apparent from the following detailed description of the presently preferred embodiment of the invention, taken in conjunction with the accompanying drawings.

BEST MODE FOR CARRYING OUT THE INVENTION

Section I
Overview

Figure 1:
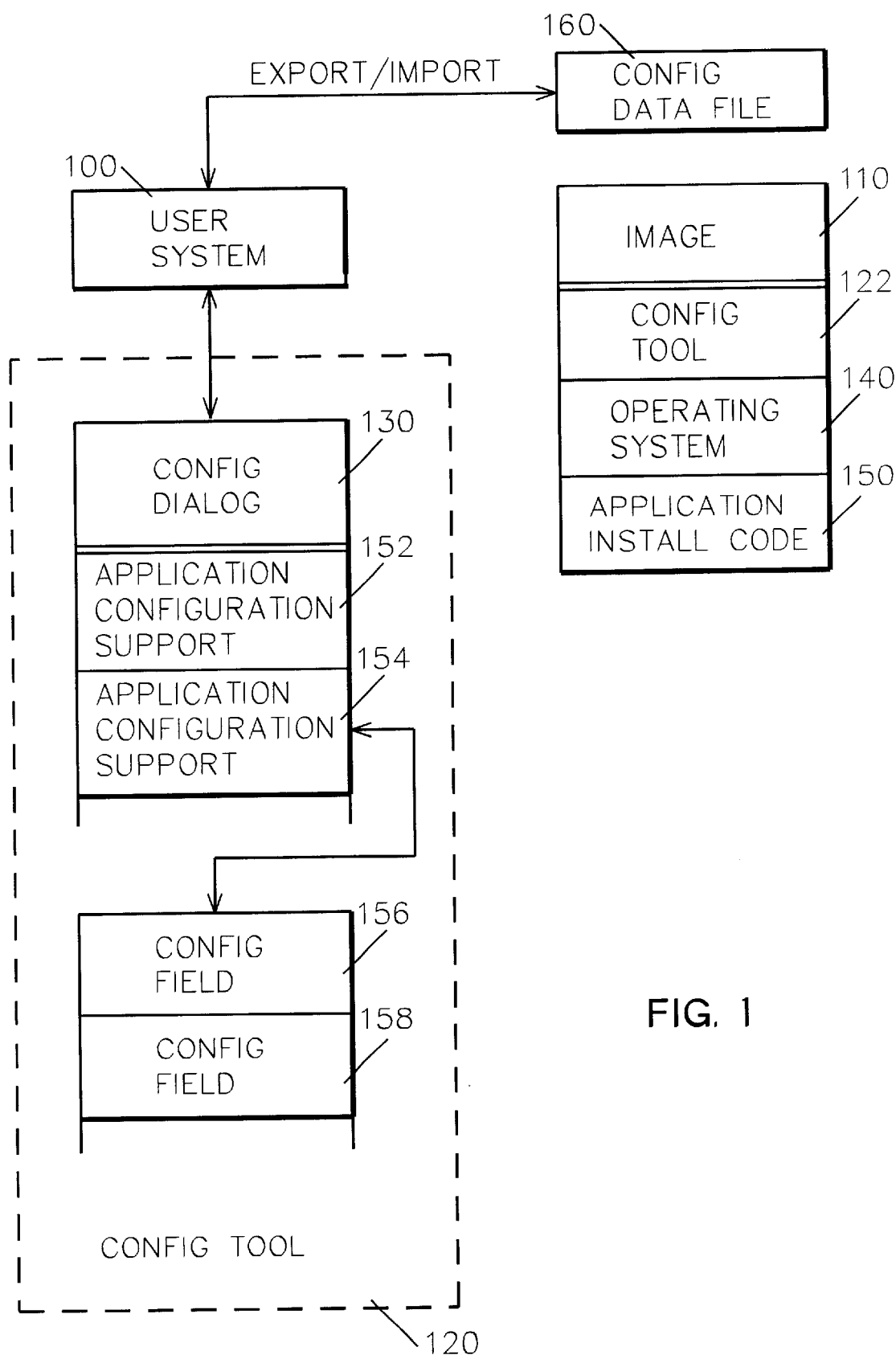
FIG. 1 is a diagrammatic representation of a system for configuring a personal system.

Referring to FIG. 1, in accordance with the preferred embodiment of the system of the invention, a system 100 previously cloned with an operating system 140 and a collection of applications 150 has personal configuration data customized for the user receiving the system by a configuration tool 120. Such configuration data includes TCP/IP addressing information and local area networking (LAN) information. When configuration tool 120 is used in an interactive mode, a dialog 130 displays the existing configuration and allows the installer or user to modify and save it. When configuration tool 120 is used in a non-interactive mode, that is, for migration, the machine configuration information is obtained from or put to configuration data file 160 without using configuration dialog 130 (as will be described hereafter in connection with FIG. 6). In interactive mode, dialog 130 is displayed with the list of all the supported applications 152, 154 that are found to be installed on the system 100. Selecting one of the listed applications brings up the application dialog 155. On the application dialog are fields 156, 158 for each of the configuration items for that application 154. Configuration data can be imported from a file 160, and it may be exported to a file 160. This allows an installer to export from an old system and import into the new one when hardware is being upgraded. Also, the import and export feature is used to automate configuration and information gathering. Import and export features may be used in either interactive or non-interactive mode for moving configuration data with respect to configuration data file 160. Configuration information required by each application 150 may include information which must be personalized for each user, and that which is common for all users. Configuration data that is unique per user is included in the configuration dialog 130, while common configuration data (that doesn't have to changed) is set in the image 110 from which the machine is cloned. This allows for the most streamlined configuration inasmuch as common data is not presented in dialog 130. For example, changing a TCP/IP address is simpler using the tool than from a control panel (which typically includes many pages of information which must be configured). Also, a read only attribute may be used on selected configuration data in a preexisting environment so as to preserve that data when required for applications in a new environment.

In some cases special configuration is done to make the application integrate better with the rest of the system. As an example, PCOM is set up so that multiple sessions can be started from the shortcut that is established from the desk top configuration portion of the configuration tool.

Figures 2, 2A:
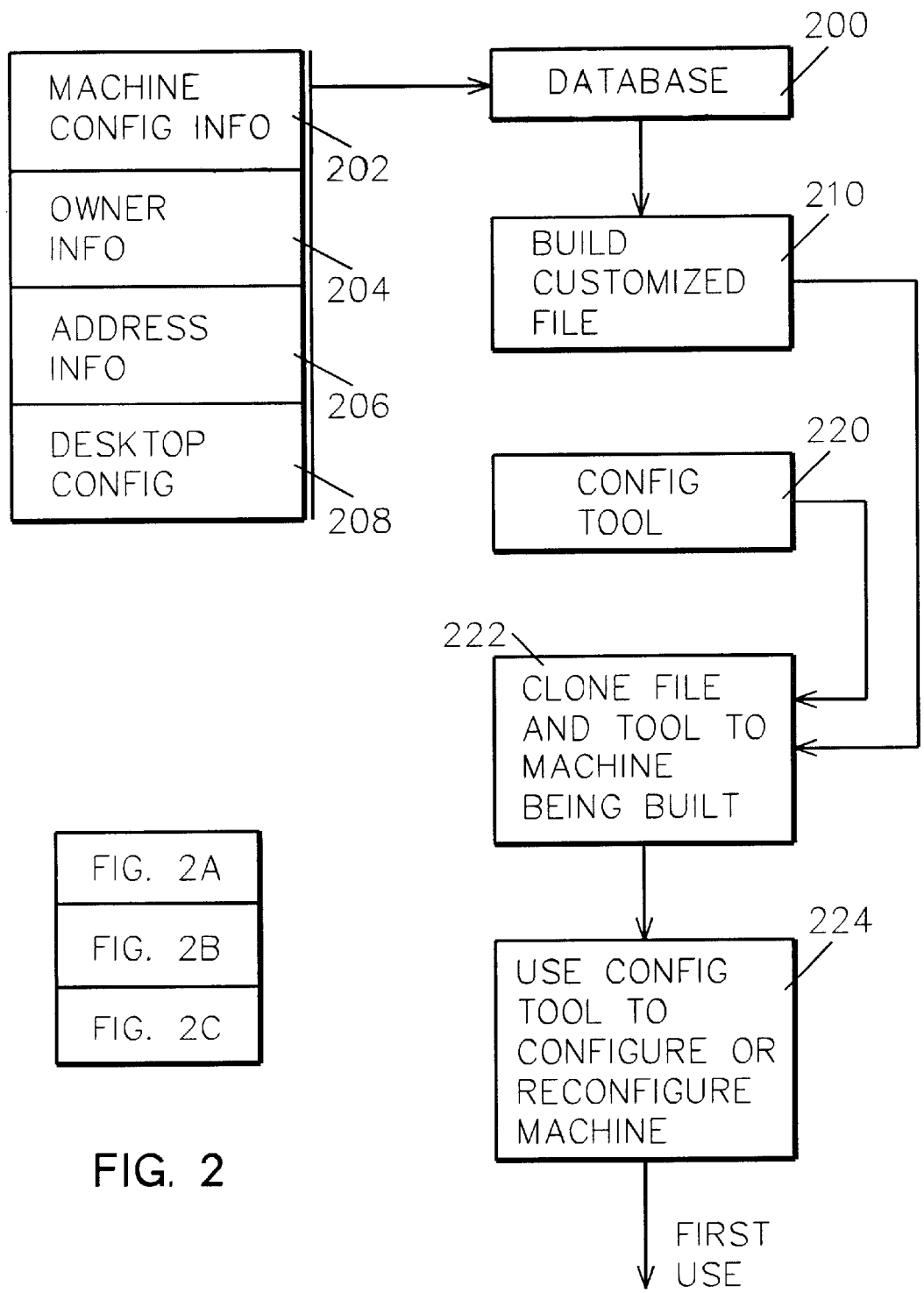
FIG. 2 is a low chart illustrating the operation of the configuration tool of a preferred embodiment of the invention for configuring a new machine without migration.
Figure 2B:
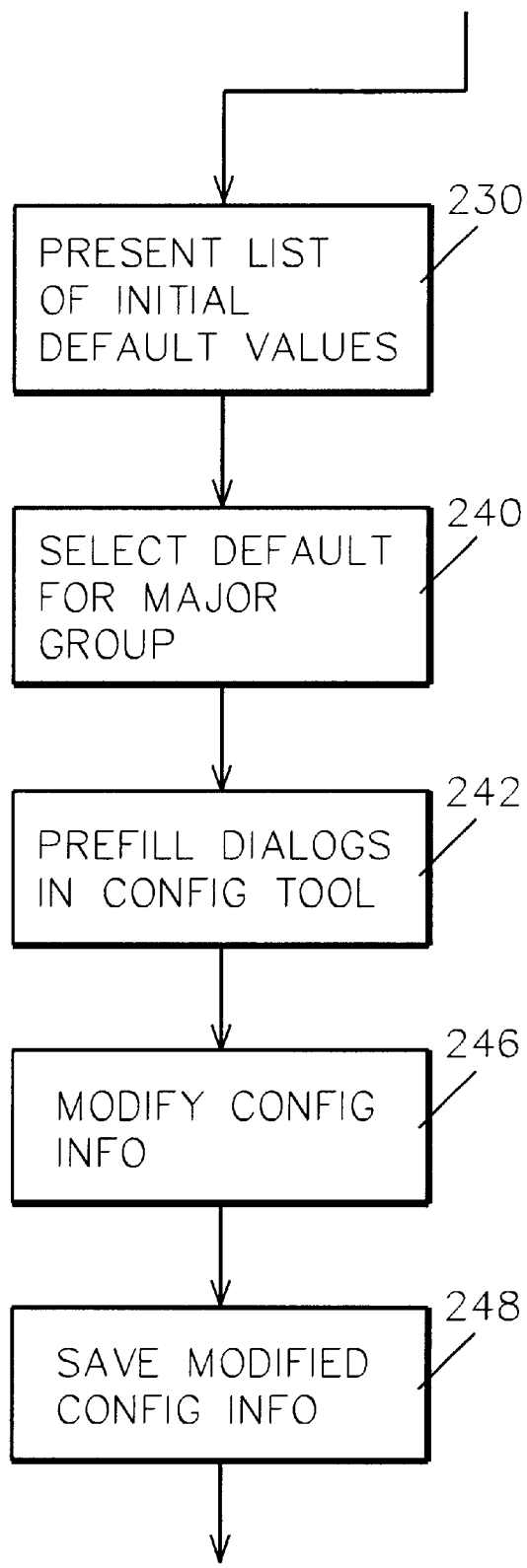
Figure 2C:
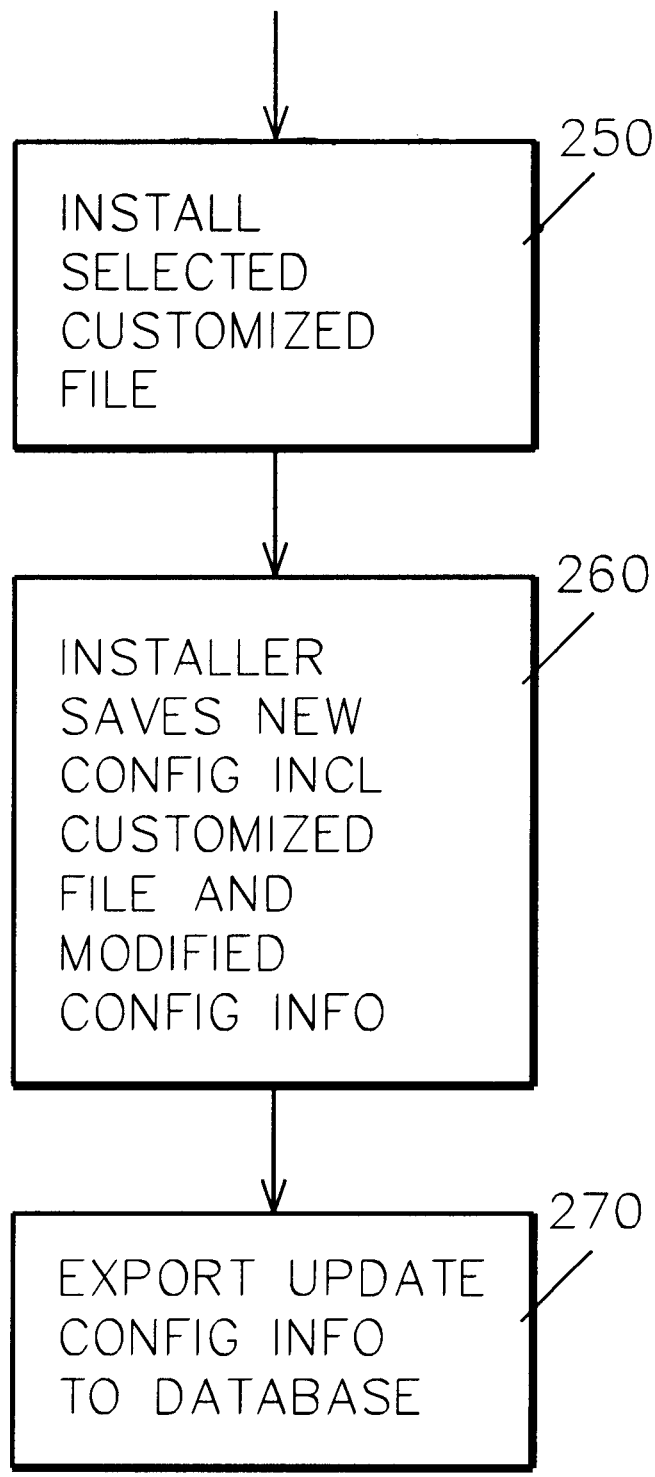
Figure 3:
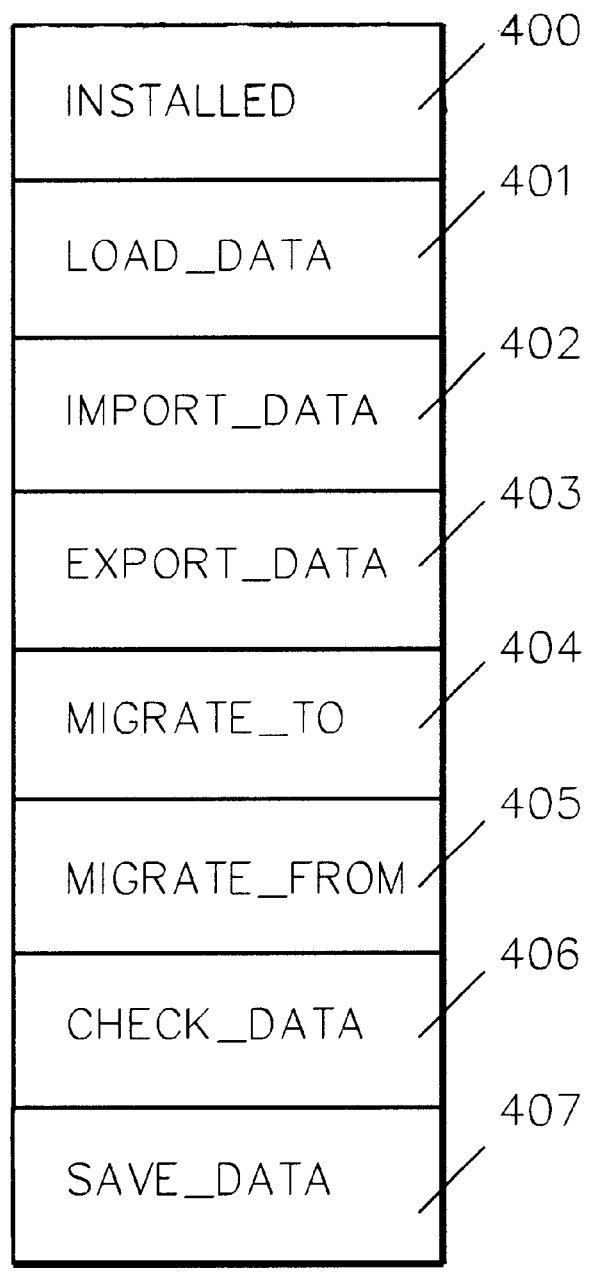
FIG. 3 is a diagrammatic representation of the methods defined for each supported application.

Referring to FIG. 2, by way of overview, the configuration tool operates as follows. First a customized file 210 is constructed by an asset management process. This customized file has configuration information 202 in it that is unique to the machine being built. Owner information 204 as well as addressing information 206 and desktop configuration 208 are included in this file 210. The configuration data in this file is all collected into a database 200 prior to the machine build so this is simply an output from several databases combined into a single file.

Next in step 222 the configuration tool 220 and the customized file from step 210 are placed on the machine 100 being built. This is done as part of the build process, and the image of the system being cloned contains both the configuration tool 220 and the customized file 210. Once on the machine, the configuration tool 210 can be used at any time to configure or reconfigure the system. In step 230, the first time that the configuration tool is executed a list of initial default files is presented to the installer. This list contains several generic files, one for each major group of customers, and the customized file. In step 240, the installer selects one of the initial default files. In step 242, the configuration tool prefills the dialogs 130. In step 246, this data can then be modified if it is not complete and then in step 248 saved as the configuration for the user system 100 being built. When the customized file is chosen in step 250 then no further updates would be needed and in step 260 the installer saves the new configuration.

Lastly, these import and export files 160 are very much like the Windows INI files in format. That is, there are several sections, one or more per application. Within each section are variables or lines that directly correlate to input fields in the configuration tool dialogs.Some of this exported data is ignored during inport, such as memory size, disk drive information, and other system data. It is included in the export file so other processes can use it. As is represented by step 270, one example provides for gathering machine information to populate a data base with information required for future hardware update planning.

A preferred embodiment of the invention, referred to as the Personal System (PerSys) Configuration, is a utility program that allows a user to configure or migrate a workstation. This utility accommodates three categories of applications, as follows.

1) Configurable applications, these have a dialog containing all of the configurable data for the application. This configurable data can be saved or exported into a data file similar in format to a Windows INI file. This data file can then be read or imported as a later time allowing the configuration to be migrated to another machine.
2) Migratable applications, these do not have a dialog for configuration. Applications in this category have data or support files that are stored on temporary resources during the migration. These files are then placed back on the new machine to complete the migration.
3) Applications that are both configurable and migratable, these use both the PerSys data file and additional support files. These applications can be configured and/or migrated using the PerSys utility.

Application Support

Figure 4:
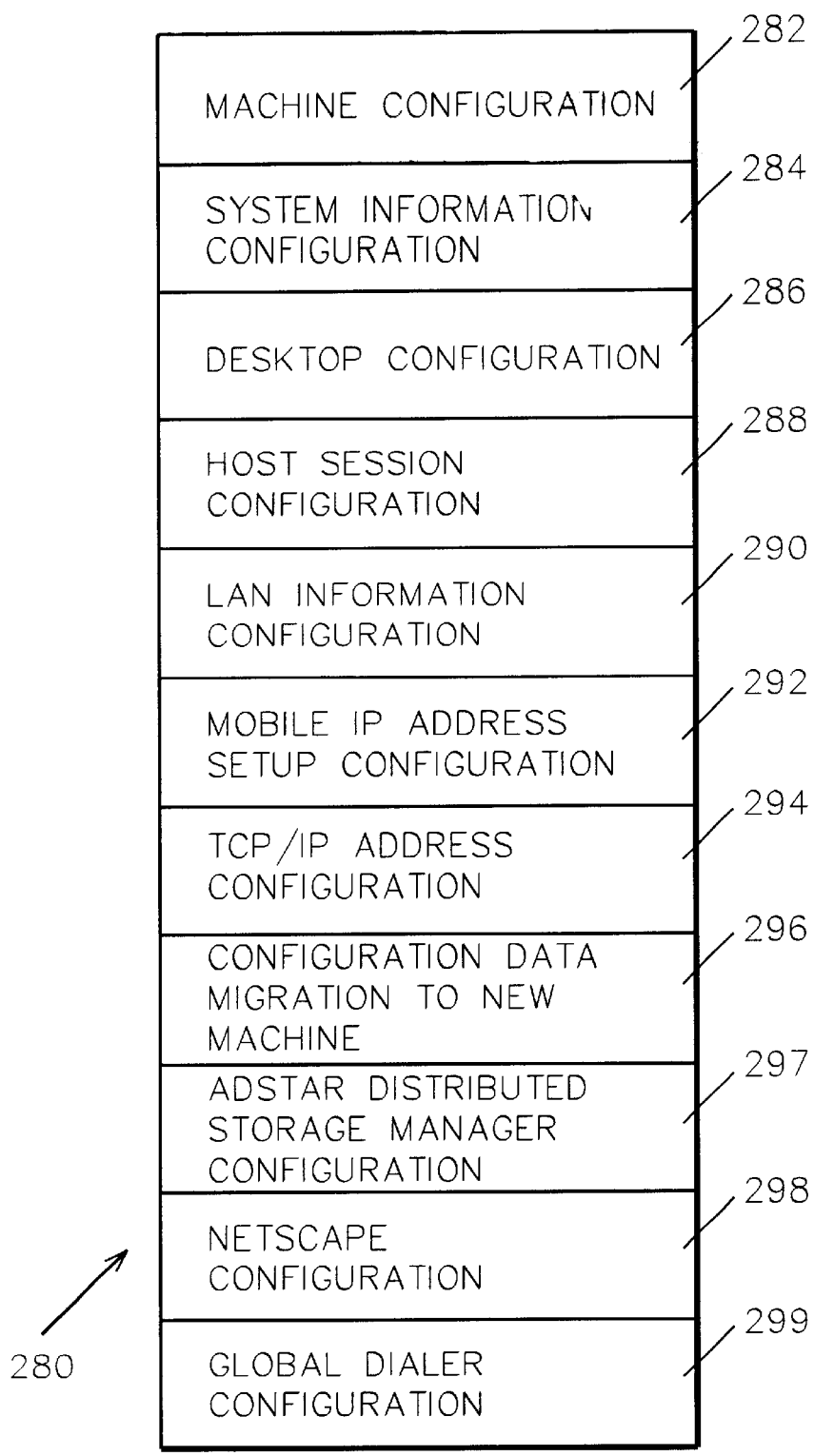
FIG. 4 is a diagrammatic representation of the procedures implementing specific applications supported by the configuration tool of the preferred embodiment of the invention.

Referring to FIG. 4, each supported application has several methods defined. These methods are then called by the main program to preform needed operations. This object oriented approach allows the details of the application configuration to be separated from the main program.

The following methods are defined for each application that is to be supported.

installed 400

This method installed( ) 400 is used to determine if the application is installed on the machine.

load_data 401

This method load_data( ) 401 is used to load the configuration data for the application into memory.

import_data 402

This method import_data( ) 402 is used to move the configuration data held in an export file into memory replacing the configuration data that was there.

export_data 403

This method export_data( ) 403 is used to write the configuration data stored in memory into an export file.

migrate_to 404

Method migrate_to( ) 404 migrates any special control files from the current machine onto a backup.

migrate_from 405

Method migrate_from( ) 405 migrates any special control files from a backup onto the new machine.

check_data 406

This method check_data( ) 406 is used to check the data that is stored in memory.

save_data 407

This method save_data( ) 407 moves the configuration data in memory back to the machine configuring the application according to this data.

These methods 400–407 are used during the execution of the main program. This use can be interactively if the dialogs are in use or automatically if the tool is being used for a migration.

Interactive Execution

When called with no arguments the program comes up in interactive mode. Referring to Table 1, the flow of execution in this mode is as follows;

1. Each supported application is checked. The installed method 400 for each application is called to check for an installation of it on the workstation. If not installed then the application is not included on the active list.
2. Once the list of active applications is built then the application data for each is loaded into memory. The load_data method 401 for each application is called to do this.
3. The configuration dialogs are displayed allowing a user to enter, import or export configuration data.
    Importing application data is done by calling the import method 402 for each application in the list.
    Exporting application data is done by calling the export method 403 for each application in the list.
4. The updated configuration data is checked and if an error is found then the dialog is redisplayed (step 3, above) so that corrections can be made.
5. The updated configuration data is used to configure the applications

TABLE 1

INTERACTIVE EXECUTION

FOR EACH SUPPORTED APPLICATION
    CALL INSTALLED( );
        IF PRESENT, ADD APPLICATION TO ACTIVE LIST;
FOR EACH APPLICATION IN ACTIVE LIST
    CALL LOAD_DATA( );
DISPLAY DIALOG;
LOOP UNTIL SAVE BUTTON IS PRESSED;
ACTION BY USER:
    CASE IMPORT:
        FOR ALL APPLICATIONS IN ACTIVE LIST
            CALL IMPORT_DATA( );
    CASE EXPORT:
        FOR ALL APPLICATIONS IN ACTIVE LIST
            CALL EXPORT_DATA( );
    CASE DATA ENTERED:
        UPDATE CONFIGURATION DATA IN MEMORY;
SET OK FLAG TO TRUE;
FOR ALL APPLICATIONS IN ACTIVE LIST
    CALL CHECK_DATA( );
    IF DATA NOT OK
        SET OK FLAG TO FALSE;
    ENDIF;
    IF OK FLAG NOT TRUE
        RETURN TO DISPLAY DIALOG;
        ELSE FOR ALL APPLICATIONS IN ACTIVE LIST
            CALL SAVE_DATA( );
    ENDIF;
END;

Migration from an Old or Existing Machine

Referring to Table 2, there are two steps used to migrate data from an existing machine and place it on temporary backup. The first step is used to get the configuration data required for the network connection and the second gets all configuration data including a second copy of the network connection data. Since these two steps are so similar they will be included in the same description. The flow of execution in this mode is as follows;
1. Each supported application is checked. The installed method 400 for each application is called to check for an installation of it on the workstation. If not installed then the application is not included on the active list.
2. Once the list of active applications is built then the application data for each is loaded into memory. The load_data method 401 for each application is called to do this.
3. Exporting application data is done by calling the export method 403 for each application in the list. On the first call only network applications are done. The export method for each application is called to do this.
4. Migrating application files is done by calling the migrate to method 404 for each application in the list. This is only done on the second call since this information is not needed to connect to the network.

TABLE 2

MIGRATION FROM AN EXISTING MACHINE

FOR EACH SUPPORTED APPLICATION
    CALL INSTALLED( );
        IF PRESENT, ADD APPLICATION TO ACTIVE LIST;
FOR EACH APPLICATION IN ACTIVE LIST
    CALL LOAD_DATA( );
FOR EACH APPLICATION IN ACTIVE LIST
    CALL EXPORT_DATA( );
FOR EACH APPLICATION IN ACTIVE LIST
    CALL MIGRATE_TO( );
END;

Migration to a New Machine

Referring to Table 3, there are two steps used to migrate data that was migrated from the old machine to the new machine. The first step is used to set up the network so that the new machine can connect to the temporary backup used to store the configuration from the old machine. The second call moves the old configuration onto the new machine. Since these two steps are so similar they will be included in the same description. The flow of execution in this mode is as follows.
1. Each supported application is checked. The installed method 400 for each application is called to check for an installation of it on the workstation. If not installed then the application is not included on the active list.
2. Once the list of active applications is built then the application data for each is loaded into memory. This is required so that the default configuration will be the existing configuration. The load_data method 401 for each application is called to do this.
3. Importing application data is done by calling the import_data method 402 for each application in the list. On the first call only network applications are done.
4. Migrating application files is done by calling the migrate from method 405 for each application in the list. This is only done on the second call since this information is not needed to connect to the net work.

TABLE 3

MIGRATION TO A NEW MACHINE

FOR EACH SUPPORTED APPLICATION
    CALL INSTALLED( );
        IF PRESENT, ADD APPLICATION TO ACTIVE LIST;
FOR EACH APPLICATION IN ACTIVE LIST
    CALL LOAD_DATA( );
FOR EACH APPLICATION IN ACTIVE LIST
    CALL IMPORT_DATA( );
FOR EACH APPLICATION IN ACTIVE LIST
    CALL MIGRATE_FROM( );
END;

Section II

Interactive Mode of Operation

Referring to FIG. 4, the following configuration procedures are implemented by the configuration tool of an exemplary embodiment of the invention:

Configuring a machine 282
Configuring system information 284
Configuring the desktop 286
Configuring Host sessions 288, including
  Configuring a host session profile
  Configuring multiple sessions to start
Configuring Local Area Network information 290
Configuring Mobile IP Address Setup 292
Configuring the TCP/IP address 294
Migrating data (import/export) to a new machine 296
Configuring ADSTAR Distributed Storage Manger 297
Configuring Netscape 298
Configuring Global Diler 299

As will be apparent to those skilled in the art, the configuration tool of the invention can support many other, similar types of applications by providing for each application the application support methods 400–407.

Procedure for Configuring a Machine 282

Configuring a machine in the interactive mode involves configuring configurable applications. (Migration only applications do not have configuration dialogs and will be described hereafter.) The procedure is as follows:

1) Select the application to be configured from the list of applications. Clicking on the application name in the list selects that application and displays the application configuration dialog.
2) Fill in all of the configuration data on the configuration dialog for the selected application.
3) Repeat steps 1 and 2 for each application that is to be configured. Return to previously configured applications if needed to verify or change settings.
4) Once all of the applications are configured as desired, press the Save/Exit button. This will first cause the Personal System Configuration program to check all of the configuration settings that have been made. If an error is found then the configuration dialog where the error occurred will be displayed along with an error message. All errors must be corrected before the new configuration settings will be saved.

Procedure for Configuring System Information 284

The System dialog displays and allows editing of system information that is stored in the registry. This data is straight forward and self explanatory. The only special case would be the system serial number and machine type. This data will be gathered from the machine BIOS if possible, or if not available there these fields become input fields for the user to fill in.

To configure this information, the installer fills in dialog fields with appropriate information. Following is list of the fields on this dialog and a description of each.

Operating System Field
This field contains the operating system currently running on the system. This is an output only field.

Processor Field
This field contains the processor type present on the system. This is an output only field.

Memory Field
The field contains the amount of memory installed on the system. This is an output only field.

Drive Information Field
This multiple line field contains information about each of the disk drives present on the system. Use the scroll bars to view the entire list. This is an output only field.

Image Information Field
This multiple line field contains the history.img records that describe the software levels installed on the system. This is an output only field.

BIOS Date
The date of the system BIOS is placed in this field. This is an output only field that will only be filled in if the BIOS of the machine supports storage of the machine serial and type.

System Serial Field
An attempt is made to query the system BIOS for the serial number. If this information can be obtained from the BIOS then it is filled in here and this will be an output field only. If it is not obtained from the BIOS then the serial number is entered in this field manually.

System Model/Submodel Field
An attempt is made to query the system BIOS for the model and submodel. If this information can be obtained from the BIOS then it is filled in here and this will be an output field only. If it is not obtained from the BIOS then the model and submodel is entered in this field manually.

Product ID Field
The proof of license product ID is entered in this field. It is illegal to have this software on a machine without a valid product license. If you do not have a valid license, format the C: and D: drives on this computer immediately.

Registered Organization Field
The Owner of this copy of Windows is entered in this field. Normally this is IBM or your division name.

Registered Owner Field
The name of the machine's owner is placed in this field.

Owners Employee Serial
The employee serial number of the owner of this machine is filled in here. This is a required field and an error will occur if the serial number is not entered.

Regional Settings
Clicking on this button will start the regional settings process. This process opens several dialogs including keyboard, command prompt and modem setting dialogs. The regional settings for this machine can then be changed from these dialogs. Since he control panel applications are used for this the regional settings can not be imported or exported.

Procedure for Configuring the Desktop 286

The Desktop Configuration dialog is used to specify what applications will have shortcuts on the desk top.

Following is the procedure for having a short cut placed on the desktop.

1) Locate the desired application in the table. As the highlighted application is changed the location field changes to reflect the location of the application in the start programs menu. Most short cuts in the start programs menu are included in the table of applications. Exceptions to this are installs, uninstalls, helps, tutorials etc.
2) Check the column that represents where on the desktop the short cut to the application is to be placed.

The columns in the table are

All Start Up
This column will be displayed on both Windows 95 and Windows NT. Checks in this column will put a short cut in the start up folder to be started by all users when the operating system starts.

All Start Menu
This column will be displayed on both Windows 95 and Windows NT. Checks in this column will put a short cut in the start menu for all users. These will be seen when the Start button on the task bar is clicked.

All Desk Top
This column will be displayed on both Windows 95 and Windows NT. Checks in this column will put a short cut on the desk top for all users.

All Send To

This column will be displayed on both Windows 95 and Windows NT. Checks in the column will put a short cut in the sendto folder for all users. These will be seen when the right mouse button from the Windows Explorer is clicked on a file. Selecting one from the popup menu will call the application and pass it the file name.

My Start Up

This column will be displayed on Windows NT only. Checks in this column will put a short cut in the start up folder to be started by the current user only when the operating system starts.

My Start Menu

This column will be displayed on Windows NT only. Checks in this column will put a short cut in the start menu for the current user only. You will see these when you click on the Start button on the task bar.

My Desk Top

This column will be displayed on Windows NT only. Checks in this column will put a short cut on the desk top for the current user only.

My Send To

This column will be displayed on Windows NT only. Checks in the column will put a short cut in the sendto folder for the current user only. These are seen when the right mouse button from the Windows Explorer is clicked on a file. Selecting one from the popup menu will call the application and pass it the file name.

Task Bar

This column will be displayed on both Windows 95 and Windows NT. Checks in this column will place the application on the task bar. This is only available if Lotus SuiteStart 97 is checked in the All Start Up or My Start Up columns.

Procedure for Configuring Host Sessions 288

The Personal Communications dialog displays and allows editing of configuration data associated with the Personal Communications application.

The dialog is divided into two sections. The top section contains the session profile configuration settings. These session profiles are stored on the system in the PRIVATE directory as files with the .WS extension. Each session that is opened uses a session profile to specify how to connect to the host and what host to connect to.

The bottom section contains the batch configuration settings. The batch process is a way to open one or more sessions along with printing capabilities using ZipPrint. The batch process will open sessions using the session profiles that are defined in the upper portion of the dialog. Each batch process is stored on the system in the PRIVATE directory as files with the .BCH extension.

Procedure for Configuring a Host Session Profile

The upper portion of the Personal Communications dialog is used to modify session profiles.

To modify an existing session profile

1) Select the profile to be modified in the Profile File Name drop down list.
2) Make the changes to the displayed data in the upper part of the dialog.

To add a new session profile

1) Click the New button on the upper half of the dialog.
2) Enter the name of the new profile. The name entered will become the name of the .ws file that will be saved in the PRIVATE directory.
3) Fill in the upper portion of the dialog with the configuration information for the new profile.

To delete a session profile

1) Select the profile to be deleted in the Profile File Name drop down list.
2) Click on the Remove button in the upper section of the dialog.
3) Click on Yes to confirm the deletion.

Following are the fields described:

Profile File Name List Box

All of the existing profiles contained in the PRIVATE sub-directory are listed here. Selecting one will update the upper portion of the dialog with the settings from that profile.

Screen Size Selection

The size chosen here will become the size of the screen for any session started with this profile.

Keyboard Map File Selection

The keyboard map file chosen here is used to map the keyboard for any session started with this profile. The keyboard map files listed here are from the PRIVATE sub directory. The configuration dialogs that are accessible from a running session must be used to create or edit a keyboard map file.

Protocol Selection

The protocol selected here is used to communicate to the host. Telnet3270 Host/Address is used if Telnet3270 is chosen. If SLAN is chosen then the SLAN Configuration File must be filled in and the Configure button must be used to configure the SLAN connection.

Telnet3270 Host/Address Field

This is the TCP/IP address of the host to connect to when the Telnet3270 protocol is selected.

SLAN Configuration File Combo Box

All existing SLAN configuration files are listed here. Selecting one will use it to configure the emulator for SLAN if SLAN is the chosen protocol. To create a new SLAN configuration file enter the new file name and when the Configure button is pressed instructions on how to create it are provided.

Procedure for Configuring Multiple Sessions to Start

The lower portion of the dialog sets up batch files that are used to start sessions.

To modify an existing batch profile

1) Select the Batch File Name to be modified by selecting it from the dropdown list.
2) Check Use ZipPrint if ZipPrint is to start for all of the sessions started with this batch. ZipPrint will allows the session screen and files form the host to be printed on the local printer.
3) Check the sessions that are to be started with this batch.
4) Select the session profile that is to be used for each session being stated.

To add a new batch profile

1) Click the New button on the lower half of the dialog.
2) Enter the name of the new batch profile. The name entered will become the name of the .bch file that will be saved in the PRIVATE directory.
3) Modify the new batch as described above.

To delete a batch profile

1) Select the batch profile to be deleted in the Batch File Name drop down list.
2) Click on the Remove button in the lower section of the dialog.
3) Click on Yes to confirm the deletion.

Below are the fields described:

Batch Profile List Box

All of the existing batch files contained in the PRIVATE sub directory are listed here. Selecting one will update the lower portion of the dialog with the settings from that batch file.

Use ZipPrint Check Box

Checking this box will start a ZipPrint session for all sessions started.

Session A–D

Checking one or more of the sessions will add it to the batch file. This will cause a session to be opened using the selected profile.

Profile Selection

All of the profiles in the sub directory PRIVATE are listed here. The one selected will be used to start this session if the session is checked Procedure for Configuring Local Area Network Information 290

The LAN dialog displays and allows editing of Local Area Network configuration data.

To configure this information

Fill in the fields with appropriate information.

Below is a list of the fields on this dialog and a description of each.

Computer Name Field

The computer name is the NETBIOS name on the network. For example, a standard may be to enter MnnnnnnA, with nnnnnn being the employee serial number. If an employee has more then one machine change A to B, C . . . etc.

Domain/Workgroup Field

This is the name of the Windows workgroup or OS/2 domain that this machine belongs to. Entering the same name here for several workstations will allow them to be displayed in the network neighborhood.

Under NT the appropriate key strokes are done into the Network Control panel to assign this machine to the workgroup entered here. NT Domains are not supported.

Description Field

This is the line that is to be displayed in the network neighborhood of other machines.

Procedure for Configuring Mobile IP Address Setup 292

The Mobile IP Address Setup dialog allows a user of a mobile (MOB) system to configure multiple addresses for TCP/IP. The appropriate address can then be selected when the mobile system is moved from one location to another.

This dialog can be displayed from either Personal System Configuration or from Mobile IP Address Setup. The contents of the dialog are almost identical, the Save/Exit and Help buttons are not displayed from within Personal System Configuration. Also the Use Address button will close the dialog when in Mobile IP Address Setup.

To add a new address to the list

1) Click on the Add Address button.
2) Fill in the TCP/IP dialog as described in How to configure the TCP/IP address.
3) Click on Yes to save the changes to the address in the list. This does not save the changes permanently, that is done when upon exiting Personal System Configuration or Mobile IP Address Setup.

To edit an existing address on the list

1) Click on the address to be edited.
2) Click on the Edit Address button or if in Personal System Configuration then double click on the address in the list. Double clicking an address from within Mobile IP Address Setup will 'use' the address.
3) Fill in the TCP/IP dialog as described in How to configure the TCP/IP address.
4) Click on Yes to save the changes to the address in the list. This does not save the changes permanently, that is done when exiting Personal System Configuration or Mobile IP Address Setup.

To remove an address from the list

1) Click on the address that to be removed.
2) Click on the Remove Address button.
3) Click on Yes to verify the removal of the address.

To use an existing address

1) Click on the address to be used.
2) Click on the Use Address button or if in Mobile IP Address Setup then double click on the address in the list. Double clicking an address from within Personal System Configuration will 'edit' the address.

To have Mobile IP Address Setup start automatically

1) Press the Add Autostart button. If Mobile IP Address Setup is already being started automatically then pressing the Remove Autostart button to stop it from being started automatically.

There is an output only field at the top of the dialog that contains the name of the address from the list that is currently assigned to the system.

Procedure for Configuring the TCP/IP Address 294

These procedures in connection with the description of the application program interface.

Procedure for Migrating Data to a New Machine 296

Procedure for Configuring ADSTAR Distributed Storage Manager 297

Procedure for Configuring Netscape 298

Procedure for Configuring Global Diler 299

These procedures 296–299 are similar to those previously described. Description follow of the corresponding application program interfaces.

SECTION III

PERSYS UTILITY INTERFACE DESCRIPTION

The user interface for this exemplary embodiment has been described above (Section II). In this Section III the application program interface (API) 130 is described. Generally, the fields of the user interface described above in Section II have a one-to-one correspondence to the lines of the API described in this Section III.

The Personal System Configuration utility (PerSys) is a utility that allows a user to configure many applications and system settings through a single interface 130. Migration from one workstation to another is also facilitated by using PerSys through export and import operations.

The applications and system settings supported by PerSys are the following.

System data 284.

Desktop configuration 286.

Personal Communications.

Local Area Network 290.

Mobile IP Address Setup.

TCP/IP address.

ADSTAR Distributed Storage Manager.

Netscape.

Global Diler.

Command Line Arguments

Figure 5:
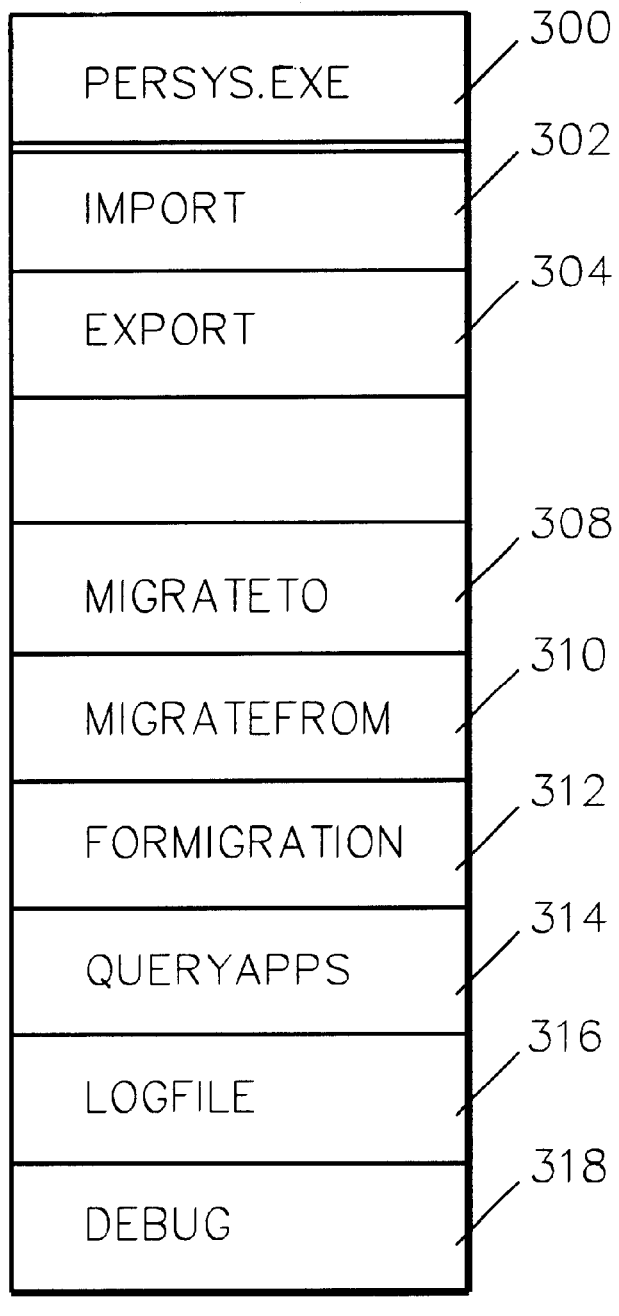
FIG. 5 is a diagrammatic representation of command line arguments for executing the configuration tool on either a machine being configured or a machine from which a configuration is being obtained.

Referring to FIG. 5, PerSys can be called from the command line, program object(OS/2) or short cut (Windows) and be given one of many arguments. This command line interface allows PerSys to be used in special situations where its function must be automated (that is, non-interactive mode). Several of the command line arguments can be combined by entering the list of desired arguments.

Import/Export and Migration

The following import, export and migration options are used to aid in the import, export and migration of configuration data and files.

Export the Configuration to a File

The export option 304 is used to automatically export all PerSys data to a given file. This is done by loading PerSys and then preforming a normal export operation. Once the export is complete PerSys terminates without displaying the normal dialogs.

Syntax: persys export=file

Where:

file

The fully qualified file name of the export file to be created.

Import the Configuration From a File

The import option 302 is used to import configuration data from a given file. When the file is not found and it is on the A: drive then a message dialog will prompt the user to insert the disk into drive A:. If the file does not exist and it is not on the A: drive then no action is taken.

Syntax: persys import=file

Where:

file

The fully qualified file name of the import file.

Migrate Configurations to a Temp Directory

The migrateto option 308 is used to migrate all application configurations and files to a given directory. This directory is then moved to a new system and used to configure the new system using the migratefrom option.

Syntax: persys migrateto=path

Where:

path

The path where the configuration and files are to be placed.

Migrate Configurations from a Temp Directory

The migratefrom option 310 is used to configure a new machine from the application configuration data and files placed there with the migrateto option.

Syntax: persys migratefrom=path

Where:

path

The path where the configuration and files were placed.

Force the Import or Export of Core Connection Applications

The formigration option 312 is used to tell PerSys that the Import or Export is for the preparation of a migration. This is equivalent to excluding the applications that are not needed for the machine to attach to a back up method. In order to be useful this option must be used with the Import or Export options.

Syntax: persys formigration

Query Application Information

The queryapps option 314 is used to return information about installed applications to the caller. This information is returned in a file whose name is passed with the option. An example of such an output file contains the following:

FoundApp=System

System.OS=Windows 95 4.0 Build 950

System.Processor=Intel Pentium

System.Drives=C: Free(15.30M) Total(401.38M);D: Free(59.52M) Total(629.80M);

System.BIOSDate=02/18/1997

System.MachineSerial=78Z6106

System.MachineModel=9546-U4A

FoundApp=DeskTop

FoundApp=Pcom

Pcom.Profiles=3

Pcom.Batches=3

FoundApp=LAN

FoundApp=MobSetup

MobSetup.Locations=1

FoundApp=ADSM

FoundApp=Netscape

Netscape.Profiles=2

FoundApp=IPDial

IPDial.Users=2

IPDial.CallingProfiles=2

FoundApp=Notes

Syntax: persys queryapps=file

Where:

file

The fully qualified file name of the created data file.

Specify the Name of the Log File

The logfile option 316 is used to specify the name of a log file that will be used to place included and excluded file names in during the migration process. This option is used in conjunction with the migrateto option. The entries in this file can then be used to build the list of files that needs to be backed up during migration. Here is an example of the content of the file:

Include=d:\develop\ftp\IBMMD.htm

Exclude=d:\netscape\Users\IBMMD\bookmark.htm

Include=d:\develop\ftp\notes.ini

Exclude=C:\WINDOWS\notes.ini

Include=d:\develop\ftp\migrate.psd

Syntax: persys logfile=file

Where:

file

The fully qualified file name of the created data file.

Migrating All Configurations and Files

Figures 6, 6A, 6B, 6C:
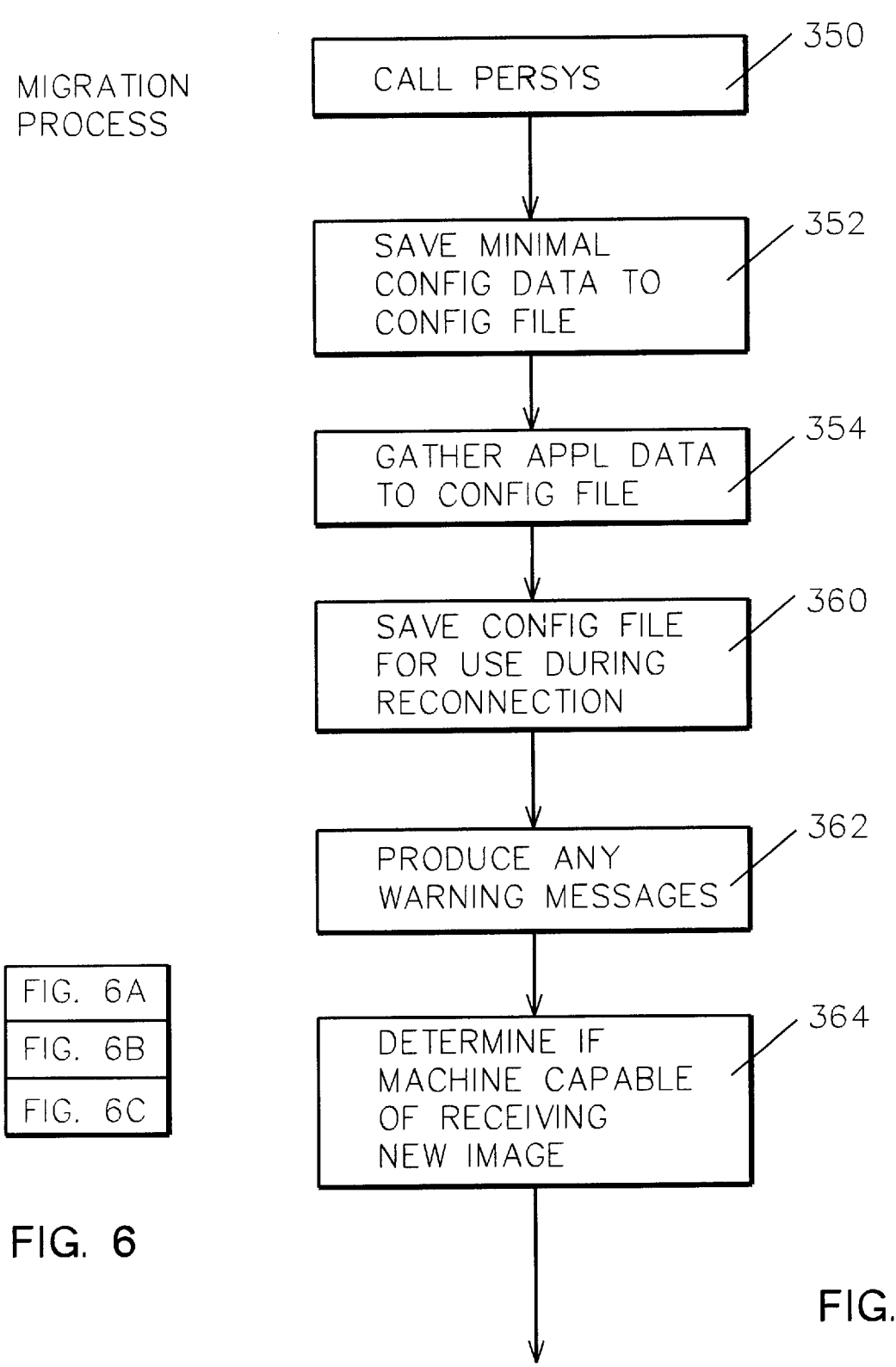
FIG. 6 is a flow chart illustrating the migration process of the preferred embodiment of the invention.
Figure 6B:
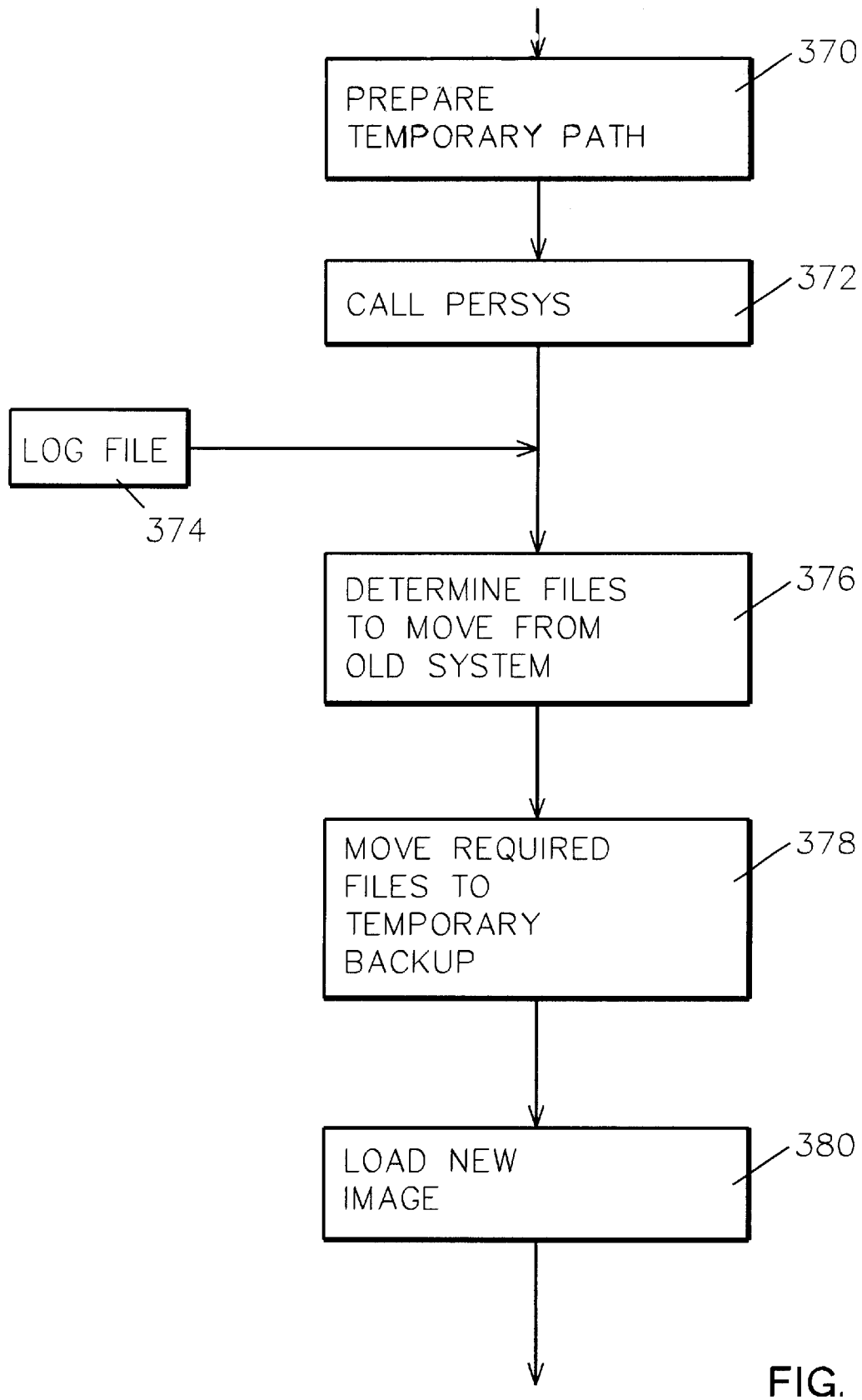
Figure 6C:
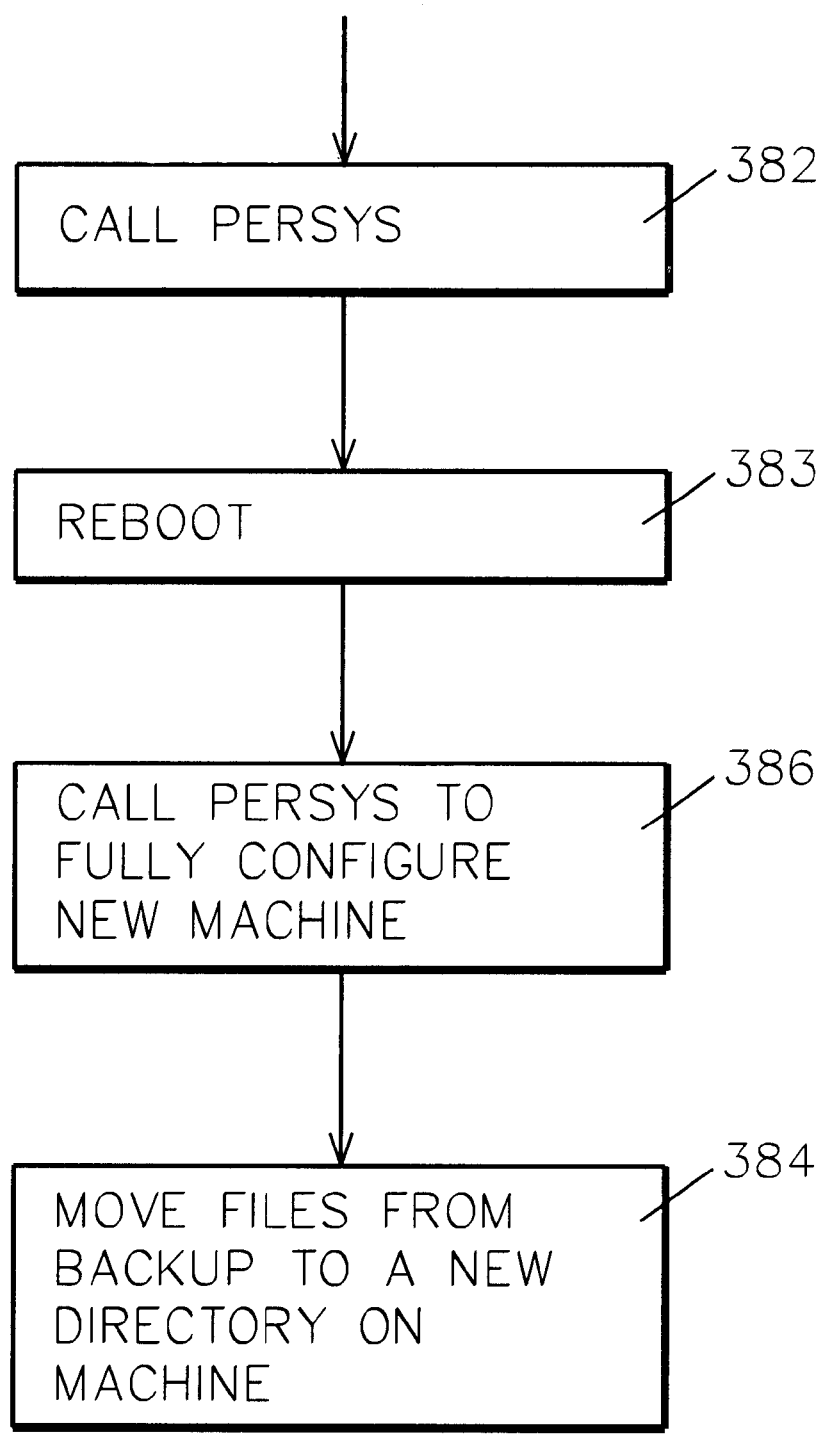
Figure 7:
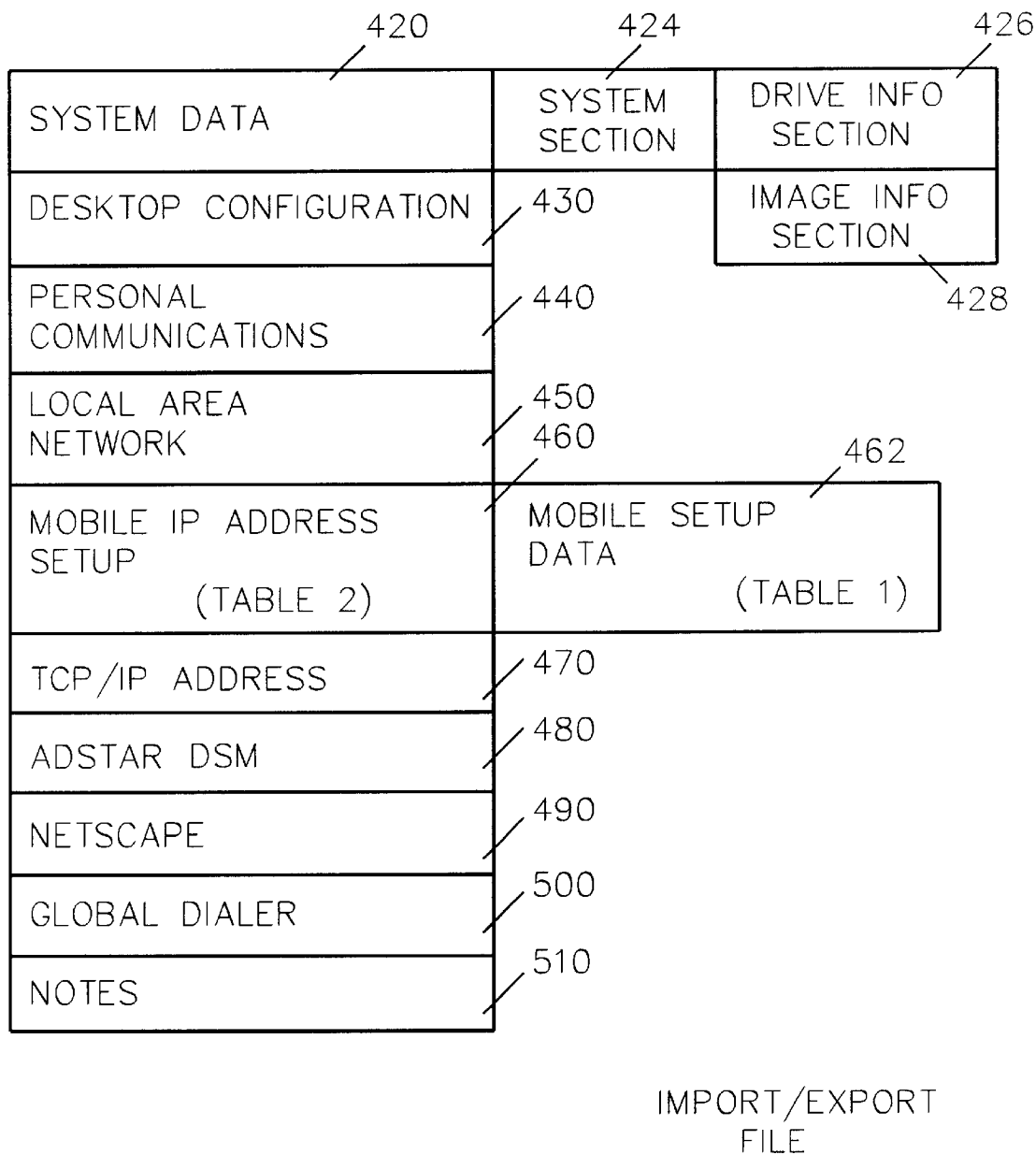
FIG. 7 is a diagrammatic representation of an Import/Export file in accordance with the preferred embodiment of the invention.

Referring to FIG. 6, during the migration process PerSys will be called by the migration tool in the following way. Other steps may also be done by the calling program but only the steps that PerSys requires will be listed here.

1) In step 350, PerSys is called to save in step 352 minimal configuration data for reconnection and to gather in step 354 application data with the following syntax:

PERSYS export=configfile formigration queryapps=queryfile

2) In step 360, the returned configuration data in the configfile is placed on the A: drive for use during reconnection of the new machine.

3) In step 362, the application data is used to produce any warning messages and determine in step 364 if the machine is capable of having the new image placed on it.

4) In step 370, a temporary path is prepared for use with the migration.

5) In step 372, PerSys is called to migrate application configuration and files with the following syntax:

PERSYS migrateto=workpath logfile=file

6) In step 376, the log file 374 content is used to determine what files must be moved from the old system.
7) In step 378, the required files are moved to the temporary backup.
8) In step 380, the machine is loaded with the new image.
9) In step 382, PerSys is called establish a connection on the new system using the following syntax:

PERSYS import=configfile formigration

10) In step 383, the new machine is rebooted so that the network software can use the new configuration information to connect to the network (remote or local) containing the temporary backup file.
11) In step 386, PerSys is called to fully configure the new machine using the following syntax:

PERSYS migratefrom=workpath

12) In step 384, the files are moved by PerSys from the temporary backup to a directory on the new machine.

Application Detection and Import/Export

Following is a description of how each application is found on the machine and details about the import/export file. For most of these applications, the lines in the import/export file correspond to fields in the application dialog previously described.

The export file 160 is similar to an ASCII INI file. There are several sections designated by a section name surrounded in square brackets. Each application 150 will read or write at least one of these sections into the import/export file 160. Within the section there can be lines of text reflecting exported data or a line in a section could be in the form variable=value. Some applications combine the two within the section.

System data 420
Application Detection

No detection is done for the system data dialog 420. It will always be included unless the nosystem argument is given.
Import/Export Section The system dialog 420 exports several sections into the export file.

First is the System section 424. This section holds machine system information in the variable=value form. The following variables are in this section, each corresponding to a field on the dialog.
OperatingSystem
    The operating system and build number.
Processor
    The processor type.
Memory
    The amount of memory installed in the system.
BIOSDate
    This is the date stamp of the system BIOS. If the BIOS-INFO utility is not available then this field will be blank.
Serial
    This is the serial number assigned to the machine. If the BIOSINFO utility is not available then this data can be entered by the user.
Model
    The machine type and model.
ProductID
    This is the Windows 95 or NT product ID or license number.
RegOrg
    The registered organization of the owner of the Windows 95 or NT licence.
RegOwner
    The registered owner of the Windows 95 or NT license.
EmpSer
    The employee Serial Number of the owner of the machine.

Second is the DriveInfo section 426, containing the hard drive information for the machine. This section has a line for each hard drive that exists on the system. The drive letter is followed by the free space and lastly the total size is included.

Third is the ImageInfo section 428, containing the image information included in the history.img file. Each line of the history.img is included as a line in the export file.
Desktop Configuration 430
Application Detection The desktop configuration dialog 430 will be included unless the nodesktop argument is given. The taskbar column is only included in the dialog if the Lotus Suite Start application is installed. The first subkey found on the software\lotus\suitestart path is checked for the en key on the \paths\work sub path in the hkey current user hive of the registry. If a path is found there then it is used as the location of link files that will be placed on the task bar. The task bar column will then be included on the desk top dialog.
Import/Export Section There is a section in the export file for each column on the desk top configuration dialog 430. Within each section there is a line for each link file that exists on the desk top in that section. On the line is the name of the link file which is also the label that it has on the desk top. Windows NT has additional columns for the current user as well as for all users. If an export file generated on Window NT is imported into Windows 95 then the current user sections are imported into the all user sections so that the applications will not be lost. During any import links are only included if that link is in the Start Programs tree of the machine where the import is being done. Following are the sections that are in the export file:
StartUp
    The start up folder for all users on Windows 95 and NT.
MyStartUp
    The start up folder for the current user on Windows NT.
StartMenu
    The start menu for all users on Windows 95 and NT.
MyStartMenu
    The start menu for the current user on Windows NT.
DeskTop
    The desk top for all users on Windows 95 or NT.
MyDeskTop
    The desk top for the current user on Windows NT.
SendTo
    The send to for all users on Windows 95 or NT. This is the list of applications accessed by pressing the secondary mouse button and moving to Send To while using the explorer.
MySendTo
    The send to for the current user on Windows NT.
TaskBar
    The links that are placed on the taskbar by the Lotus Suite Start application.
Personal Communications 440
    OS/2 support for multiple profiles and batch files is only for export. During import on OS/2 only a single profile and batch file is supported.
Application Detection
    The installation of pcom is determined by finding the pcsws.exe executable. The private sub directory off of this location is then used to find all files that are needed for pcom configuration. If the nopcom option is given then pcsws.exe is considered to have not been found on the system thus the pcom dialog will not be included.

Import/Export Section

Configuration data for multiple work station profiles as well as batch files is supported in the export file. For upward compatibility all profile and batch data is included in the Pcom section. The data in this section is in the variable= value format.

All profile data following a Profile= line up to the next Profile= line is placed in the profile specified. All the batch data following a Batch= line up to the next Batch= line is placed in the batch specified. The variables in this section are:

Profile

The name of the profile containing the configuration information that follows.

Link

The link type to be used by this session.

KeyFile

The name of the keyboard file that will be used with this session. The path is not included here to allow for migration among installations where pcom is installed on different paths.

HostName

The name of the host to connect to for this session while using the telnet protocol.

SLANFile

The name of the SLAN configuration file to be used with this session if the SLAN protocol is in use. The path is not included here to allow for migration among installations where pcom is installed on different paths.

ScreenSize

The screen size to be used for this session.

Batch

The name of the batch file containing the following batch configuration.

ZipSessions

Determines what sessions ZipPring will be started with. The absence of this or blanks for the value will not start ZipPrint for this batch file.

Session

This specifies the profile to be used for a session in this batch file. There will be a Session line for each session that is to be opened with this batch file.

FixTo

This specifies what session letter this session is tied to. Absence of this or blanks for the value allows this session to take the next available letter.

There will also be a section for each keyboard map file that existed. There is no provision in the interface to create or modify these files but they are exported so that all required keyboard maps are available during import. These sections are exported in the OS/2 version. The Windows version uses these sections on import to create keyboard map files.

Each keyboard map file has its own section PcomKMP= file where file is the name of the file. The path is not included here to allow for migration among installations where pcom is installed on different paths. Within the keyboard map section each line of the keyboard file is included as a line. Each line is proceeded with . . . so that the sections in the keyboard map file will not be seen as sections in the export file.

Local Area Network 450

Application Detection

In OS/2 the existence of the ibmlan.ini file is used to determine if the dialog should be included.

In Windows 95 or NT the existence of a computer name and domain indicate that the dialog should be included. The existence of the nolan argument will override this and cause the dialog to not be included.

Import/Export Section

The LAN section 450 holds the Local Area Network configuration. This section is in the variable=value format and includes the following:

ComputerName

The name of the system on the network.

Domain

The name of the workgroup (Windows) or domain (OS/2) that the machine belongs to.

Description

This is only supported on Windows 95 or NT and is used in the network neighborhood display of other machines on the network.

Mobile IP Address Setup 460

Application Detection

Existence of the mobsetup.exe file on the system indicates that the mobsetup dialog should be included. If the nomobsetup argument is given then the dialog will not be included even if the mobsetup.exe file is found.

Import/Export Section

Due to upward compatibility issues the data that is placed in the export file by the Windows version of PerSys is different than what OS/2 places in the file. The Windows version does understand the OS/2 format so that OS/2 to Windows migration can be accomplished.

When Windows reads the MobSetup data it attempts to read data from the following sections. If data is found in a section then no further searching is done.

1. Look for the Mob Address Setup section.
2. Look for the Mob Setup section and take defaults for any data not supported by this OS/2 data.
3. Look for the TCP/IP section and build a single entry from the data found there.

When OS/2 reads the import file it only recognizes the Mob Setup section.

When exporting data the Windows version writes the Mob Address Setup section and also a TCP/IP section. The TCP/IP section includes the addressing information that is currently in the registry for each card. This is included so that a migration to a machine that does not have MobSetup can be done without losing the address information. The OS/2 version only exports the Mob Setup section. Following is a description of these sections.

Mob Setup

This is a column oriented section used by OS/2 for saving MobSetup data. Each line of data represents an address in the selection list for MobSetup. Since it is column oriented, spacing of the data is important. Table 4 describes each column in the data.

TABLE 4

MOBILE IP ADDRESS SETUP DATA (OS/2)

| Name | Start | Width | Description |
| --- | --- | --- | --- |
| Description | 3 | 40 | The description of the address in the list. |
| Domain | 44 | 40 | The domain for this address. |
| Address | 85 | 15 | The TCP/IP address for this address in the list. |

TABLE 4-continued

MOBILE IP ADDRESS SETUP DATA (OS/2)

| Name | Start | Width | Description |
| --- | --- | --- | --- |
| Broadcast | 101 | 15 | The broadcast address; this is optional and can be left blank. |
| Netmask | 117 | 15 | The net mask to be used with this address. |
| Router | 133 | 15 | This is the address of the net work router for this address. |
| Name servers | 149 | End | The blank delimited list of name servers for this address. |

Mob Address Setup

This is a delimited list of address information used by the Windows version of PerSys. Each line in the section contains the data for one of the addresses in the list. There can be address information for each physical card that is installed on the system. Each piece of information for a card is delimited with the /$/ string. The fields are listed in the Table 5 in the order that they appear on the line.

TABLE 5

MOBILE IP ADDRESS SETUP DATA (WINDOWS)

| Name | Description |
| --- | --- |
| dhcp | Designates whether DHCP is to be used. |
| Description | The description that is displayed in the list. |
| Domain | The domain for this address. |
| Host Name | The host name assigned to this address. |
| Address | The TCP/IP address for this address in the list. |
| Netmask | The net mask to be used with this address. |
| Routers | A Blank delimited list of routers for this address. |
| Name Servers | The blank delimited list of name servers for this address. |
| Automatic MTU | Designates whether the system should automatically set the MTU. |
| Max MTU | The maximum MTU to use when not in automatic mode. |
| CardName | This is the name of the network card for this address. |
| Suffix Search | The blank delimited list of suffix search domains. |

The /!/ string delimits each physical cards addressing data. All fields except domain, Host Name, Name Servers and Suffix Search are used by additional cards. These fields will be set to = for the additional cards.

There is also a line in the Mob Address Setup section that picks the address that is currently in use. This line is in the variable=value format as follows:

InUse=description

Where description is the description of the address that is to be currently in use.

TCP/IP address 470

Application Detection

The TCP/IP dialog is included if MobSetup is not installed. On OS/2 a check for the etc directory is also done. If the notcpip argument is given then the dialog will never be included.

Import/Export Section

The TCP/IP section is in the variable=value format. There is some TCP/IP information that is shared by all physical cards. The shared data is only placed in the section once since it is shared. The following are these shared variables:

Host
    The host name assigned to this machine.
Domain
    The domain for this machine.
Nameservers
    The blank delimited list of name servers for this machine.
Suffix
    A blank delimited list of suffix search domains.

There is also some data that is assigned to each physical card in the machine. Each physical card will place the following data in the export file. The card owning the data will be determined by the NetworkCard variable. All data after a NetworkCard line belongs to that card up to the next NetworkCard line.

NetworkCard
    The name of the network card owning the following TCP/IP information. This is the name that is given to the card in the registry. OS/2 does not support more than one card so this variable is ignored by the OS/2 version.
Address
    The TCP/IP address of this card.
Mask
    The net mask to be used by this card.
Router
    A Blank delimited list of routers used by this card.
MaxMTU
    The maximum MTU to use with this card if not in automatic mode.
AutoMTU
    Designates whether the system should automatically set the MTU.
DHCP
    Designates whether DHCP is to be used on this card.

When an import is done with the Windows version, each network card in the import file is searched for on the machine. If the card is not located then the TCP/IP information for that card will be placed in the first non-dial card that is installed on the machine. This allows for a migration path from one machine to the next even when the network card on the new machine is different.

ADSTAR Distributed Storage Manager 480

Application Detection

In Windows the system is searched for the dsmc.exe file and then the dsm.opt file in the same directory. If both are found then the ADSM dialog is included unless the noadsm option exists. OS/2 simply searches for the dsm.opt file to determine if ADSM has been installed on the machine.

Import/Export Section

The ADSM section 480 contains all of the ADSM data. This section is in the variable=value format with the following variables:

Node
    This machines node name to the ADSM server.
Server
    The TCP/IP address of the ADSM server that is to be used.
PWType
    The type of password support to be used. This can be GENERATE to have ADSM automatically generate a new password when the current one expires or MANUAL to have the user enter the desired password and store it in the dsm.opt file. This variable is only supported on Windows.

Netscape 490

OS/2 only supports the export of Netscape data. This export can then be used to migrate machines to the Windows environment.

Application Detection

The netscape.exe is located on the machine to determine the location of the profile information and whether it is installed. If the nonetscape argument is given then the netscape dialog will not be included, otherwise the existence of the netscape.exe determines if it will be included.

Import/Export Section

The Netscape section 490 is where all of the netscape configuration information is placed. All data following a Profile line up to the next Profile line belongs to the specified profile. The following are the variables that are in the export file:

Profile
  The name of the profile that is to own the following data.
UserName
  The users name.
EmailAddress
  The users EMail address.
StartupPage
  Defines what should be displayed at startup. 0=blank page, 1=the home page defined in HomeURL, 2=the last page that was viewed.
HomeURL
  The URL of the page that is to be displayed at startup if StartPage is set up to do this.
MailServer
  The mail server address.
NewsServer
  The news server address.
ProxyType
  The proxy service to be used. 0=direct connection, 1=manual proxys, 2=automatic.
SocksServer
  The address of the manual socks server.
SocksServer_Port
  The port to use for the socks server, default is 1080.
FTPServer
  The address of the manual FTP server.
FTPServer_Port
  The port for the FTP server, default is 80.
HTTPServer
  The address of the manual HTTP server.
HTTPServer_Port
  The port for the HTTP server, default is 80.
GopherServer
  The address of the manual gopher server.
GopherServer_Port
  The port number for the gopher server, default is 80.
SecurityServer
  The address of the manual security server.
SecurityServer_Port
  The port for the security server, default is 80.
AutomaticLocation
  The configuration location URL for automatic proxy setup.

The OS/2 version does not support multiple profiles. When importing into the Windows version a profile is searched for on the machine. If not found then the imported data for the non existent profile are placed in the first profile defined on the machine. This allows a migration from one machine to the next even if the profile names within Netscape have changed.

Migration
  Migration of the bookmarks is done by first copying the bookmark.htm file to the directory specified with the migrateto option. Then this bookmark file is merged with the current one on the new system with the migratefrom option.

Global Dialer 500

Application Detection
  The tcpdial.exe is located on the machine to determine the location of the profile information and whether it is installed. If the noipdial argument is given then the dialog will not be included, otherwise the existence of the tcpdial.exe determines if it will be included.

Import/Export Section

The Global Dialer section 500 is where all of the configuration information is placed. There are two types of profiles used by the dialer. First all data following a UserProfile line up to the next UserProfile line belongs to the specified user profile. Next all data following a CallingProfile line up to the next CallingProfile line belongs to the specified calling profile. The following are the variables that are in the export file:

UserProfile
  Specifies a new user profile name.
Account
  The name of the account for a user profile.
UserID
  The user id for this user profile.
Password
  The password for this user profile. If no password was saved for this profile then this will not be in the file.
CallingProfile
  Specifies a new calling location profile name.
AccessCountry
  The country for the primary phone number.
AccessState
  The state for the primary phone number.
AccessCity
  The city for the primary phone number.
AccessNumber
  The phone number for the primary phone number.
BackupCountry
  The country for the backup phone number.
BackupState
  The state for the backup phone number.
BackupCity
  The city for the backup phone number.
BackupNumber
  The phone number for the backup phone number.
OutsideLine
  The prefix used for an outside call.
LongDistance
  The prefix used to make a ling distance call.
Pulse
  Yes if this is a pulse system or No for tone.
CallWaiting
  The prefix that is used to disable call waiting.
Modem
  The name of the modem that is to be used.
AreaCode
  The local area code.
CountryCode
  The local country code.

Notes 510

Migration
  The notes.ini file is migrated by coping it to the directory specified with the migrateto option. All of the system paths and operating system dependent data is replaced with variable names as place holders. When the file is migrated on to the new machine by using the migratefrom option then these variables are replaced with the new paths and operating system data.

By storing configuration data in a neutral (that is, operating system independent) form it is possible to migrate a user from one operating system to another.

ADVANTAGES OVER THE PRIOR ART

It is an advantage of the invention that there is provided an improved system and method for personalizing a cloned system so that it will function for a particular user.

It is an advantage of the invention that there is provided an improved system and method for configuring a machine after an image has been loaded onto that machine.

It is an advantage of the invention that there is provided a system and method for migrating a user configuration from one operating system to another.

It is an advantage of the invention that there is provided a system and method for enabling a user to reconfigure a previously deployed system for use at another location without having to reload the software on the machine.

It is an advantage of the invention that there is provided a system and method for maintaining a central database of configurations.

It is an advantage of the invention that there is provided a system and method for selectively preserving preexisting configuration information for use in a new environment.

It is an advantage of the invention that there is provided a system and method allowing a user to be migrated from one operating system to another.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. A method for configuring a computer system, comprising the steps of:
   migrating a user configuration through an intermediate configuration data file storing user configuration data in system neutral format comprising human readable characters from a first operating system to a second operating system; and
   reconfiguring said computer system with said user configuration and said second operating system.

2. The method of claim 1, further comprising the step of maintaining a central database of user configurations.

3. A method for configuring a computer system, comprising the steps of:
   building a customized migration file containing user configuration information in an intermediate configuration data file storing user configuration data in system neutral format comprising human readable characters;
   loading said customized migration file and a configuration tool on said computer system; and
   executing said configuration tool against said customized migration file to configure said computer system.

4. The method of claim 3, further comprising the steps of:
   presenting to an installer a dialog prefilled with customization data from said customized file;
   selectively receiving from said installer via said dialog new data modifying said customization data; and
   saving as a new configuration for said computer system said customized file as modified by said new data.

5. A system for configuring a computer system, comprising:
   a work station;
   a configuration utility operable on said work station selectively to configure and migrate a workstation configuration through an intermediate configuration data file storing user configuration data in system neutral format, said configuration including at least one application program selected from the set of application programs including configurable applications, migratable applications, and applications which are both configurable and migratable.

6. A system for configuring a computer system with respect to one or more applications, comprising:
   a memory;
   an export file including an intermediate configuration data file for storing user configuration data in system neutral format comprising human readable characters; and
   embodied in a computer readable medium for each application of said one or more applications,
      an installed method for determining if said application is installed on said system;
      a load_data method for loading configuration data for said application into said memory;
      an import_data method for replacing configuration data in said memory with configuration data held in said export file; and
      an export_data method for writing configuration data from said memory to said export file.

7. The system of claim 6, further comprising a backup system, and embodied in said computer readable medium for each said application of said one or more applications:
   a migrate_to method for migrating special control files from said computer system to said backup system; and
   a migrate_from method for migrating special control files from said backup system to said computer system.

8. The system of claim 6, further comprising embodied in said computer readable medium for each said application of said one or more applications:
   a check_data method for checking data that is stored in said memory; and
   a save_data method for moving configuration data in memory back to said computer system for configuring said application according to said configuration data.

9. An interactive method for configuring a workstation with respect to at least one application of a plurality of supported applications, comprising the steps of:
   a) building a list of active applications;
   b) loading into memory application data for each said active application;
   c) presenting configuration dialogs to a user for allowing said user to select to enter, import, or export configuration data;
   d) responsive to said user selecting import configuration data, executing an import method for each said active application to generate first updated configuration data in an intermediate configuration data file storing user configuration data in system neutral format comprising human readable characters; and e) responsive to said user selecting export configuration data, executing an export method for each said active application.

10. The interactive method of claim 9, further comprising the steps of:

said building step including:
executing an installed method with respect to a first supported application to determine if said first supported application is installed on said workstation; and
repeating said installed method for each said supported application; and said loading step including:
executing a load_data method for each said active application.

11. The interactive method of claim 10, further comprising the steps of:

checking updated configuration data for errors and, responsive to identifying an error, redisplaying said dialog selectively to generate second updated configuration data; and configuring said active applications in accordance with said first and second updated configuration data.

12. A method for configuring a computer system by migrating configuration data for at least one of one or more supported applications from a workstation to temporary backup on a network, comprising the steps of:

providing for each said supported application an installed method, a load_data method, an export method, and a migrate_to method;

executing said installed method for each said supported application to identify active applications on said workstation;

executing said load_data method for each said active application to load application data into memory for each said active application;

executing said export method for each said active application to export to an export file said application data for each said active application, said export file comprising an intermediate configuration data file storing user configuration data in system neutral format comprising human readable characters; and executing said migrate_to method for each said active application to migrate to said temporary backup application files for each said active application.

13. A method for configuring a computer system by migrating configuration data from an existing machine to a workstation, comprising the steps of:

providing for each said supported application an installed method, a load_data method, an import method, and a migrate_from method;

executing said installed method for each said supported application to identify active applications on said workstation;

executing said load_data method for each said active application to load application data into memory for each said active application;

executing said import method for each said active application to import from an import/export file said application data for each said active application, said import/export file comprising an intermediate configuration data file storing user configuration data in system neutral format comprising human readable characters; and executing said migrate_from method for each said active application to migrate from backup application files for each said active application.

14. A program storage device readable by a machine, tangibly embodying a program of instructions executable by a machine to perform method steps for interactive method for configuring a workstation with respect to at least one application of a plurality of supported applications, said method steps comprising:

a) building a list of active applications;

b) loading into memory application data for each said active application;

c) presenting configuration dialogs to a user for allowing said user to select to enter, import, or export configuration data through an intermediate configuration data file storing user configuration data in a system neutral format comprising human readable characters;

d) responsive to said user selecting import configuration data, executing an import method for each said active application to generate first updated configuration data; and e) responsive to said user selecting export configuration data, executing an export method for each said active application.

15. An article of manufacture comprising:

a computer useable medium having computer readable program code means embodied therein for interactive method for configuring a workstation with respect to at least one application of a plurality of supported applications, the computer readable program means in said article of manufacture comprising:

a) computer readable program code means for causing a computer to effect building a list of active applications;

b) computer readable program code means for causing a computer to effect loading into memory application data for each said active application;

c) computer readable program code means for causing a computer to effect presenting configuration dialogs to a user for allowing said user to select to enter, import, or export configuration data with respect to an intermediate configuration data file storing user configuration data in system neutral format comprising human readable characters;

d) computer readable program code means for causing a computer to effect computer readable program code means for causing a computer to effect responsive to said user selecting import configuration data, executing an import method for each said active application to generate first updated configuration data; and e) computer readable program code means for causing a computer to effect responsive to said user selecting export configuration data, executing an export method for each said active application.

16. A computer program product or computer program element embodied in a computer readable medium configured to be operable for performing steps comprising:

a) building a list of active applications;

b) loading into memory application data for each said active application;

c) presenting configuration dialogs to a user for allowing said user to select to enter, import, or export configuration data with respect to an intermediate configuration data file storing user configuration data in a system neutral format comprising human readable characters;

d) responsive to said user selecting import configuration data, executing an import method for each said active application to generate first updated configuration data; and e) responsive to said user selecting export configuration data, executing an export method for each said active application.

17. A program storage device readable by a machine, tangibly embodying a program of instructions executable by a machine to perform method steps for configuring a workstation with respect to at least one application of a plurality of supported applications, said method steps comprising:

providing for each said supported application an installed method, a load_data method, an import method, and a migrate_from method;

executing said installed method for each said supported application to identify active applications on said workstation;

executing said load_data method for each said active application to load application data into memory for each said active application;

executing said import method for each said active application to import from an import/export file said application data for each said active application, said import/export file comprising an intermediate configuration data file storing user configuration data in system neutral format comprising human readable characters; and executing said migrate_from method for each said active application to migrate from backup application files for each said active application.

* * * * *